US012260292B2

(12) United States Patent
Steinbuch et al.

(10) Patent No.: US 12,260,292 B2
(45) Date of Patent: Mar. 25, 2025

(54) LOCALIZE AN OPTICAL CODE

(71) Applicant: SICK AG, Waldkirch (DE)

(72) Inventors: Jonathan Steinbuch, Waldkirch (DE); Vicky Hallmann, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/226,889

(22) Filed: Jul. 27, 2023

(65) Prior Publication Data

US 2024/0078398 A1   Mar. 7, 2024

(51) Int. Cl.
*G06K 7/14* (2006.01)
*G06T 7/13* (2017.01)
*G06V 30/224* (2022.01)

(52) U.S. Cl.
CPC ......... *G06K 7/1443* (2013.01); *G06K 7/1417* (2013.01); *G06T 7/13* (2017.01); *G06V 30/224* (2022.01)

(58) Field of Classification Search
None
See application file for complete search history.

(56) References Cited

U.S. PATENT DOCUMENTS

| 7,546,950 | B2 | 6/2009 | Thiyagarajah |
| 9,355,293 | B2 | 5/2016 | Swayn et al. |
| 9,501,681 | B1 | 11/2016 | Wang et al. |
| 2004/0020989 | A1 | 2/2004 | Muramatsu |
| 2006/0050961 | A1 | 3/2006 | Thiyagarajah |
| 2007/0071320 | A1* | 3/2007 | Yada ............. G06K 7/1456 382/181 |
| 2010/0155464 | A1* | 6/2010 | Swayn ............. G06K 7/14 235/375 |

FOREIGN PATENT DOCUMENTS

EP   1383074 A1   1/2004

OTHER PUBLICATIONS

European Search Report dated Jan. 27, 2023 corresponding to application No. 22193715.4-1205.

* cited by examiner

*Primary Examiner* — Sonji N Johnson
*Assistant Examiner* — April A Taylor
(74) *Attorney, Agent, or Firm* — Nath, Goldberg & Meyer; Jerald L. Meyer (57) ABSTRACT

A method for locating an optical code, on the basis of a finder pattern of the optical code, in an image having a plurality of pixels, the method comprising the steps of
determining at least one candidate position for the finder pattern on the basis of edge transitions along at least one line through the image;
determining a final position of the finder pattern in a vicinity of the candidate position; and
verifying the final position, i.e. verifying that the image comprises the finder pattern in the final position, using a known property of the finder pattern.

18 Claims, 7 Drawing Sheets

LOCALIZE AN OPTICAL CODE

The invention relates to a method for locating an optical code.

Code readers are known from supermarket checkouts, for automatic package identification, sorting of postal items, from baggage handling in airports and from other logistics applications. In a code scanner, a reading beam is guided across the code by means of a rotating mirror or a polygon mirror wheel. A camera-based code reader uses an image sensor to take images of the objects with the codes on them, and image evaluation software extracts the code information from these images.

In one important application group, the code-bearing objects are conveyed past the code reader. A scanning code reader captures the codes that are fed into its reading area one after the other. Alternatively, in a camera-based code reader, a line scan camera reads the object images with the code information successively and line-by-line during the relative movement. A two-dimensional image sensor regularly captures image data that overlaps to a greater or lesser extent depending on the recording frequency and conveyor speed. To allow objects to be arranged in any orientation on the conveyor, multiple code readers are often provided on a reading tunnel to record objects from several or all sides. A scanning code reader also records remission levels and thus ultimately image lines that can be combined to form an object image, although in practice an image sensor is preferred for this purpose. In such an object image, code areas can be identified and codes can be read out.

Decoding is a relatively complex process. Therefore, usually only those image sections are fed to a decoder where an optical code has been detected during preprocessing, preferably already with further information such as exact position and orientation as well as type and size of the code. Some types of codes support localization by means of finder patterns that can be easily and robustly recognized. A QR code, for example, has finder patterns in three corners, an Aztec code one finder pattern in the center. The finder pattern itself consists of 7×7 code modules with a 3×3 field in the center surrounded by two alternating rings or rectangles.

In theory, such a finder pattern is easy to locate using the known properties. To do this, the image is searched line by line for the edge transitions characteristic of the finder pattern, and a presumed frame is placed around the finder pattern on the basis of the edge transitions. In a real image, however, there are interference, distortions, occlusions, lack of contrast and blurring. Therefore, it is necessary not to be too sharp about the conditions on the edge transitions for the finder pattern. Depending on the tolerance, this will result in an increasing number of false positive finder patterns, with the consequence that the decoder will work on image areas where there is actually no code at all. Conversely, some partially hidden finder patterns are conventionally discarded, and thus an existing code is overlooked and not read. Thus, high sensitivity and specificity in locating a code is desired in order to minimize the number of errors as described of first kind as well as second kind. However, this is not satisfactorily achieved in the prior art.

There are alternative approaches to locating finder patterns. These include template matching, Haar features, and machine learning. However, comparable errors occur with these. IN particular with machine learning, better results seem possible in principle, but not with the hardware typically available for code reading or in the short response times required for real-time code reading.

U.S. Pat. No. 9,355,293 B2 discloses a QR code recognition and decoding system that generates a template for pattern matching to locate finder patterns and thus the code.

In US 2004/0020989 A1, finder patterns along scan lines are detected based on the specific distances between black and white transitions. The document does not discuss how to deal with tolerances and errors. U.S. Pat. No. 7,546,950 B2 refers to US 2004/0020989 A1 in its introduction and also searches line by line for the known structures of the finder pattern.

It is therefore an object of the invention to improve the localization of an optical code.

This object is satisfied by a method for locating an optical code, on the basis of a finder pattern of the optical code, in an image having a plurality of pixels, the method comprising the steps of determining at least one candidate position for the finder pattern on the basis of edge transitions along at least one line through the image; determining a final position of the finder pattern in a vicinity of the candidate position; and verifying the final position, i.e. verifying that the image comprises the finder pattern in the final position, using a known property of the finder pattern.

As a precaution, it should be clarified that this is an automatic, in particular computer-implemented method, which runs, for example, in a code reader or a computing device connected thereto, such as a control device, a computer, an edge device, a network or a cloud.

The object is also satisfied by an optoelectronic code reading device comprising a light receiving element for recording an image comprising an optical code and a control and evaluation unit configured to locate an optical code, on the basis of a finder pattern of the optical code, in an image recorded using the light receiving element and having a plurality of pixels, in that at least one candidate position for the finder pattern is determined on the basis of edge transitions along at least one line through the image; a final position of the finder pattern in a vicinity of the candidate position is determined; and the final position is verified, i.e. it is verified that the image comprises the finder pattern in the final position, using a known property of the finder pattern.

An image is captured in which there is presumably at least one optical code, in particular a QR code or an Aztec code. As explained in the introduction, this can be done in one recording or successively during a relative movement, and the brightness profiles of a code scanner can also be understood as an image line. The image has a plurality of pixels, typically a pixel grid of m×n pixels.

The code is localized with the help of at least one finder pattern. First, a candidate position is determined which, at least at first glance, is part of a finder pattern. To do this, edge transitions are determined along at least one line through the image. An edge is defined as the transition between a dark and a light code element or, conversely, between a light and a dark code element. Here, the code elements are actually black and white only in a binarized image, otherwise, for simplicity, no distinction is made here between white and light shades of gray or black and dark shades of gray, respectively. The line preferably follows the row direction or column direction. Other directions are in principle also possible, but the implementation becomes more complex and discretization artifacts can arise. Throughout this specification, the terms preferred or preferably refer to an advantageous, but completely optional feature.

Then, in a neighborhood of the candidate position, the location of the finder pattern is determined. The candidate position is still quite rough, for example a single point approximately in the presumed center of the finder pattern. The position of the finder pattern, on the other hand, indicates which pixels belong to the finder pattern, for example in the form of a frame around the finder pattern. Here, the concrete representation, for example as corners or surrounding quadrilateral, is not important and not specified.

The invention starts from the basic idea to verify the finder pattern that has already been found together with its position. With the position of the finder pattern, for example a frame, its characteristics like a module size up to individual code modules become testable. A code module, or module for short, is the smallest element of the code. Corresponding to this, the module size is given as a measure of the extent of the module in pixels per module (ppm). Since it is fully known how a finder pattern must look like, further properties of the finder pattern to be verified can be checked which have not yet been used to locate it, at least in this form, or a test step can be performed which was not used to find the location.

The invention has the advantage of reducing the error rate in locating finder patterns and ultimately optical codes. Finder patterns can be detected somewhat more generously, including partially occluded finder patterns or those finder patterns where, for example, edge detection fails sporadically due to lack of contrast. This means that hardly any finder patterns are missed. Verification ensures that finder patterns that were initially accepted incorrectly are ultimately discarded correctly. Overall, the rate of errors of the first and second kind is therefore low, or, to put it positively, both the sensitivity and specificity of the recognition of finder patterns and thus codes are very high. Simple geometric operations with only a few accesses to the pixels of the image are sufficient, so that the method works efficiently and quickly and thus remains real-time capable or requires only a small portion of the short time windows available for decoding in a reading tunnel. Almost all codes are fed to the decoder (this relates to sensitivity) very quickly without having to spend computing time on image areas that actually contain no code at all (this relates to specificity). This increases the read rate and thus the most important quality criterion of a code reading application.

The candidate position preferably is determined when the edge transitions along the at least one line are spaced apart by a ratio of 1:1:3:1:1, taking into account a tolerance. This corresponds to the convention for a finder pattern of a QR code or an Aztec code with an inner 3×3 square and two surrounding rectangular rings. A special feature of this finder pattern is that these spacing ratios exist in any direction, and thus quite independently of the orientation of the code also for a line of any given direction, in particular in the line direction of the image. In a real image, the distance ratios cannot be expected to be exact, so that a tolerance is preferably allowed.

The candidate position preferably is determined as the centroid of edge transitions along the at least one line. The candidate position should be as central as possible in the finder pattern, and this is achieved at least in line direction by this center of gravity. Transversely, the center of the finder pattern can in any case not be far away, because otherwise the condition of edge transitions in the direction of the line would not be fulfilled. In particular, distance ratios of 1:1:3:1:1 are present only for lines through the central 3×3 field of the finder pattern. There are different possibilities for the calculation of the centroid, for example as the center between the two outermost edge transitions or as the average of all edge transitions.

Preferably, when the edge transitions along a plurality of mutually parallel lines are indicative of a finder pattern, the candidate position is determined centrally between the parallel lines. Several adjacent lines parallel to each other can have edge transitions that indicate the crossing of a finder pattern, in particular the distance ratio 1:1:3:1:1 between the edge transitions. The center of the finder pattern is then to be expected on the middle line or, in the case of an even number of affected lines, between the two middle lines. This center can be found in two steps by first determining a centroid per line as in the previous paragraph and then a centroid of the centroids across the line direction. However, the calculation can be done arbitrarily, for example as the center of gravity of all edge transitions of the affected lines or only of the respective outermost edge transitions or lines.

Preferably, in order to determine the position of the finder pattern in a vicinity of the candidate position along beams emanating in a star shape from the candidate position, the three nearest edge transitions on each beam are determined, in particular the three nearest edge transition on eight or sixteen beams at equal angular distance from one another. The candidate position was initially found only on the basis of lines of a same direction, in particular the line direction. The star-shaped beams now localize the finder pattern more precisely in all directions. Preferably, eight directions with a mutual angular offset of 45° or sixteen directions with a mutual angular offset of 22.5° are used. A finer angular grid becomes too costly without noticeable improvement. An uneven angular grid is conceivable but makes the silent and unwarranted assumption that some directions are more important. A uniform subdivision with a different number of rays, for example seven rays, has the disadvantage that the slope of the rays is no longer at a simple value like ½, 1 or 2 and thus discretization errors occur. The next three edge transitions, in the case where the candidate position is indeed at least mostly centered in a finder pattern, pass through the two surrounding rectangular rings. As an optional step, it can be checked whether the distances of the edge transitions in all or at least most directions are plausible with the crossing of two rectangular rings.

At least one of a first ring, a second ring, and a third ring preferably is formed, with the respective first edge transition of the beams being joined to form the first ring, the respective second edge transitions of the beams being joined to form the second ring, and the respective third edge transitions being joined to form the third ring. In other words, the respective first edge transitions of the beams are preferably connected to form a first ring, the respective second edge transitions of the beams are connected to form a second ring, and/or the respective third edge transitions of the beams are connected to form a third ring. These rings form the an estimated approximation to the edges between the center and the rectangular rings of the finder pattern.

Confirmed ring sections of the rings preferably are determined, in particular using a Sobel filter, in that they run along an edge. Edge transitions along beams may not actually correspond to rectangular rings of a finder pattern for various reasons, for example because there is no finder pattern at all at the candidate position, because along a beam an edge transition is obscured, has a poor contrast, or was missed with the set criteria for an edge transition. Therefore, an additional check is useful to see if a ring segment really runs along an edge of a finder pattern. The three rings are thereby divided into confirmed and non-confirmed ring sections, and preferably only the confirmed ring sections are processed further. If there are no confirmed ring sections or too few confirmed ring sections, the method can be aborted for that candidate position. A preferred way to confirm ring segments is to use a Sobel filter.

Ring sections of the rings preferably are classified into horizontal and vertical ring sections, wherein an orientation of the finder pattern is determined based on the horizontal and vertical ring sections. The ring sections go back to the connecting lines between the edge transitions on the star-shaped beams originating from the candidate position. If they actually run along the edges between the center and the rectangular rings of a finder pattern, they have only two orientations corresponding to the main horizontal and vertical directions of the finder pattern. At least approximately, this is also true for any found ring sections, and these are therefore clustered accordingly to find these two main directions. The main directions are then defined, for example, as the mean orientation of the ring sections of the respective cluster. All ring sections can be used or preferably only confirmed ring sections and/or, for example, only ring sections of one ring, such as the third, outermost ring.

An outermost ring section in each of the four main directions preferably is selected according to the orientation, wherein straight lines along the ring sections frame the location of the finder pattern. Once the orientation of the finder pattern has been determined, the four main directions "up", "down", "right" and "left" are defined in a coordinate system bound to these orientations. In each of these main directions, an outermost ring section is now located, preferably a confirmed ring section of the third ring. Straight lines through these ring sections form a frame around the finder pattern, that is thus localized.

Preferably, if no outermost ring section can be found in one of the main directions, the missing outermost ring section is reconstructed from other ring sections using a known structure of a finder pattern. It may be that the finder pattern in at least one of the main directions is obscured or too weak in contrast, or that for other reasons no outermost ring section can be found in this main direction, in any case no confirmed outermost ring section. In this case it is possible to reconstruct the part of the frame in this main direction from the other information, in particular from ring sections of the first and/or second ring in this main direction and/or the outermost ring sections in the main directions adjacent thereto. The basis for the reconstruction can again be the known spacing ratio of 1:1:3:1:1 of a finder pattern.

Preferably, in order to verify the finder pattern, seven mutually parallel half-lines are formed outwardly through one half of the finder pattern, starting from a main axis of the finder pattern and at a uniform distance from one another, wherein it is required for the verification of the finder pattern that 1, 2, 3, 3, 2, 1 edge transitions lie in this sequence on each of the half-lines. The seven half-lines cover one half of the finder pattern in a uniform grid. Due to the previous determination of the position of the finder pattern, module size and expected code modules together with their position within the finder pattern are known. The half-lines are located in the described grid in such a way that each half-line covers a separate row of code modules, and the half-lines together cover all code modules in the respective half of the finder pattern. Deviations from the uniform grid that do not leave the respective code module are insignificant and allowed. Provided that there is actually a finder pattern under the half-lines, the half-lines must intersect 1, 2, 3, 3, 2, 1 edges respectively in this order. This is a consequence of the structure of the finder pattern with a 3×3 center and two rectangular rings around it. Tolerances are conceivable, for example that at least one half-line does not have the appropriate number of edge transitions after all. The verification described for one half with respect to one major axis can be repeated for the other half and the two halves of the other major axis, so that a verification takes place four times. Again, a tolerance is conceivable, such as not all numbers of edge transitions of the half-lines being correct in one of the four verification steps. With these tolerances, the error rate can be adjusted between a too sharp verification, which discards actual finder patterns, and a too tolerant verification with false positive finder patterns.

The distance of the edge transitions preferably is additionally checked on at least one of the half-lines. On an outer half-line there is only one edge transition, and this should be at a distance of approximately half the size of the finder pattern. The inner half-lines should have several edge transitions as specified. For these half-lines, in addition to the last edge transition, it can also be checked whether the edge transitions have a distance from each other that is compatible with the structure of half a finder pattern. Thus, there is not only an expectation of how many edge transitions there must be, but also at which distances or positions these edge transitions are located. This allows an additional optional verification step.

Preferably it is checked whether three finder patterns arranged to form a right-angled triangle are found in the image. For a single QR code, isolated finder patterns, only two finder patterns or more than three finder patterns would not be plausible. If there are three finder patterns, they must form an isosceles rectangular triangle from which the frame for the optical code can be immediately read. This check can take place at some point within the method, in particular quite early or quite late. Very early means that there must be three matching candidate positions from the beginning in order to even examine an image section more closely. Very late means that the individual finder patterns have already been verified and only then is it checked whether there are three of them that form a matching triangle.

A region of the image localized on the basis of the finder pattern preferably is fed to a decoder in order to read the optical code. This can be done immediately after localization or with a time delay, and in the same device or a different device. Thanks to the reliable localization of an optical code, the decoder only has to deal with image sections that actually contain an optical code. This shortens decoder times and ultimately improves the read rate.

In the optoelectronic code reading device according to the invention, an embodiment of the method according to the invention for locating an optical code is implemented. Provided that an optical code is found in the method, it is preferably subsequently read, although this can be carried out with a time offset and/or in another device as just explained. Depending on the embodiment, the image sensor is a line sensor or matrix sensor of a camera-based code reader. A barcode scanner is also conceivable, whose light-receiving element records a respective intensity profile in the course of a scan, which can be treated like an image line. A system of several code readers or camera heads is also conceivable. The control and evaluation unit is preferably part of the code reader itself and, in particular, is accommodated in its housing. However, an at least partially external control and evaluation unit is also conceivable. The codes are preferably applied to objects that are conveyed on a conveyor through a detection area of the image sensor. This is a typical code reading application in stationary mounting of the code reader, or at least of the image capturing part thereof, on a conveyor device or a conveyor belt.

The invention will be explained in more detail in the following also with respect to further features and advantages by way of example with reference to embodiments and to the enclosed drawing. The Figures of the drawing show in.

Figure 1:
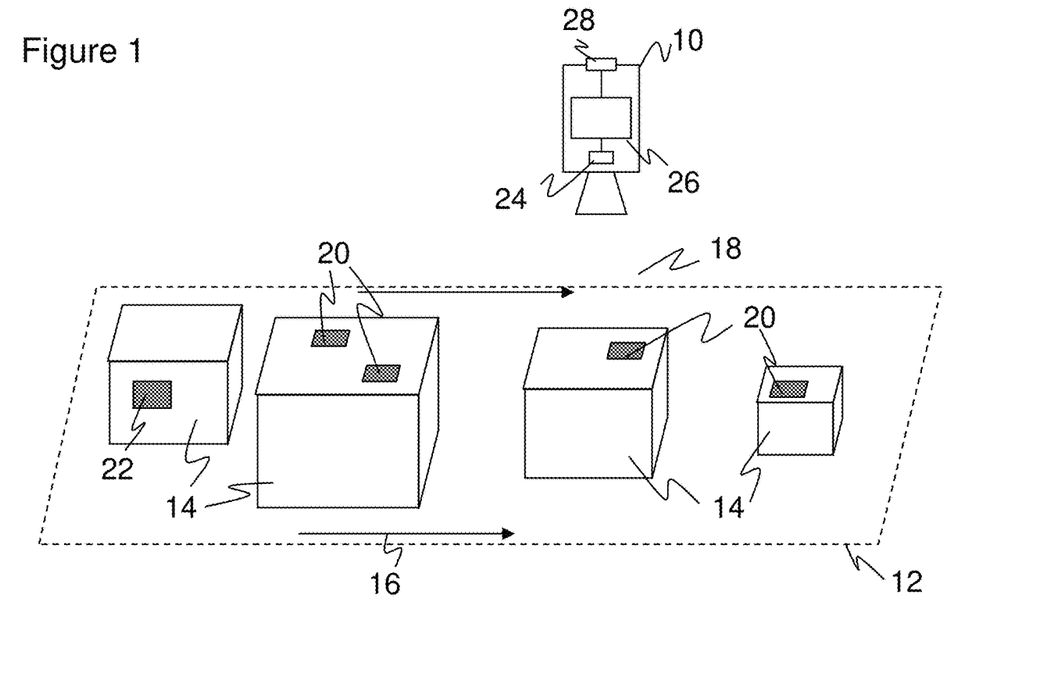
FIG. 1 a schematic overview of a code reading device mounted above a conveyor belt as an example.

FIG. 1 shows a code reader 10 mounted above a conveyor belt 12 that conveys objects 14, as indicated by the arrow 16, through the detection area 18 of the code reader 10. The objects 14 bear codes 20 on their outer surfaces, which are detected and evaluated by the code reader 10. The codes 20 can only be recognized by the code reader 10 if they are attached to the upper side or at least if they are visible from above. Therefore, in deviation from the illustration in FIG. 1, a plurality of code readers 10 can be mounted from different directions for reading a code 22 attached, for example, on the side or at the bottom, in order to enable so-called omni-reading from all directions. This stationary application of a code reader on a conveyor belt 12 is very common in practice. However, the invention relates primarily to the localization and reading of codes 20 and the code reader 10 itself, respectively, so that this example must not be understood in a limiting manner.

The code reader 10 uses an image sensor 24 to capture image data of the conveyed objects 14 and the codes 20, which are further processed by a control and evaluation unit 26 by means of image evaluation and a decoding process. For this purpose, the control and evaluation unit 26 has one or more computing modules, such as a microprocessor, an FPGA (field programmable gate array), a DSP (digital signal processor), an ASIC (application-specific integrated circuit), an AI processor, an NPU (neural processing unit), a GPU (graphics processing unit) or the like. Through an interface 28, the code reader 10 outputs information, such as read codes or image data possibly at various stages of processing.

Figure 2:
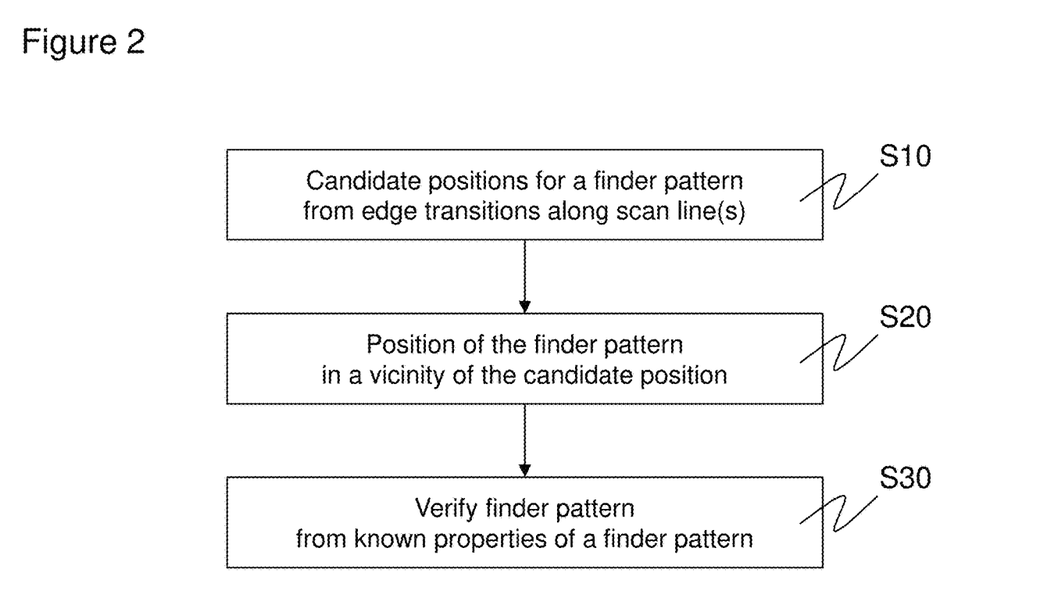
FIG. 2 an exemplary flowchart for finding a candidate position of a finder pattern, precisely locating the finder pattern, and verifying a finder pattern.
Figure 3:
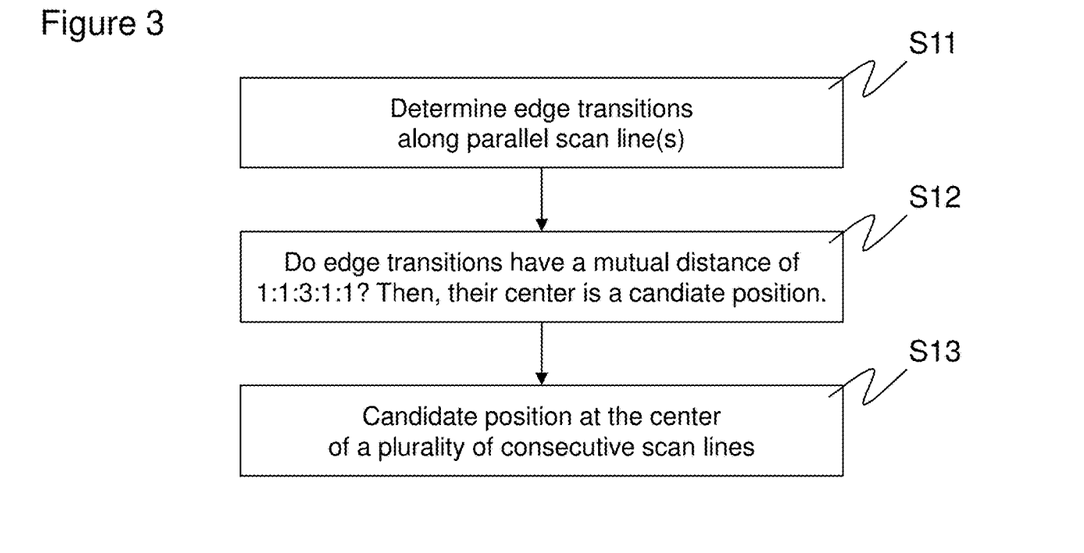
FIG. 3 an exemplary flowchart for finding a candidate position of a finder pattern.
Figure 4:
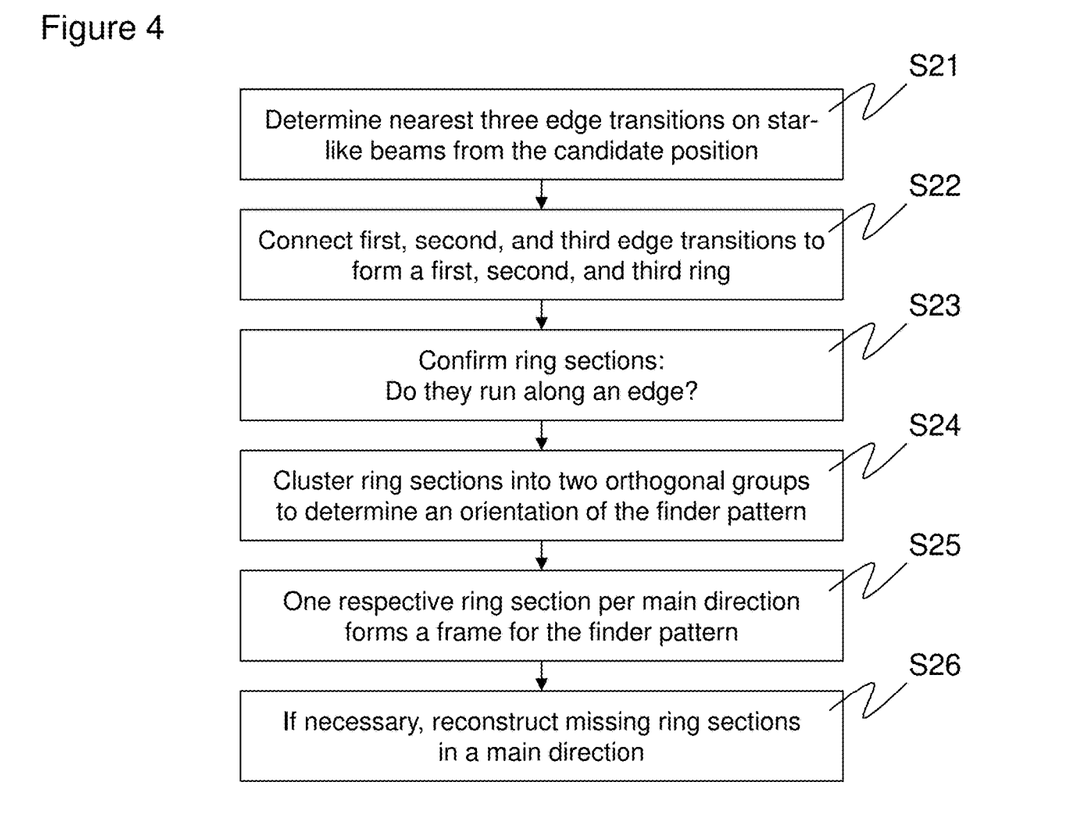
FIG. 4 an exemplary flowchart for precisely locating the finder pattern in the vicinity of a candidate position.
Figure 5:
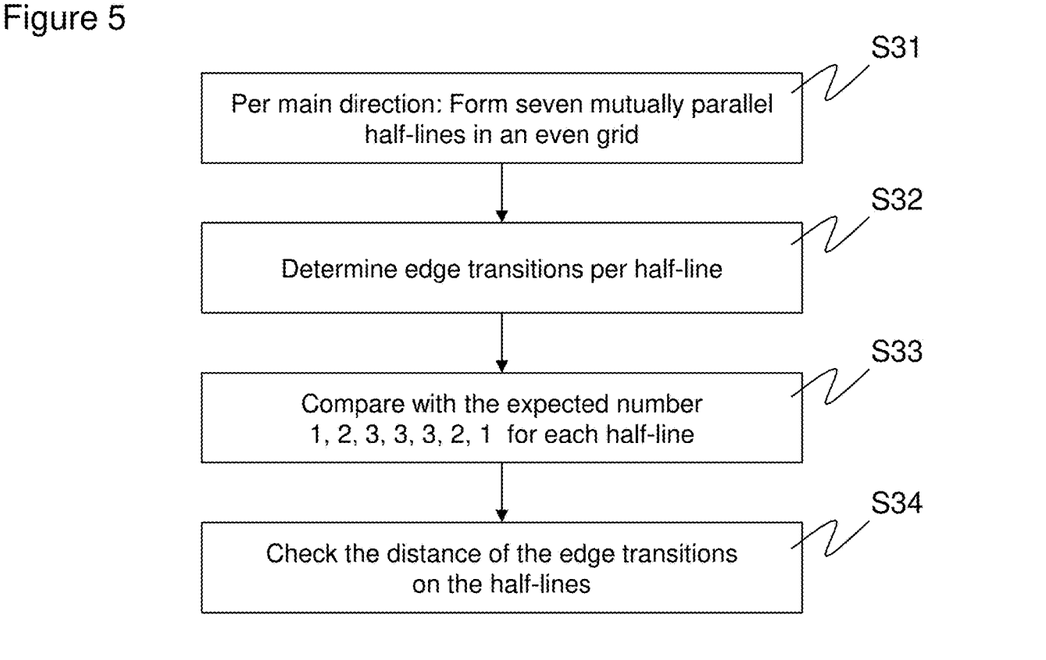
FIG. 5 an exemplary flowchart for verifying a finder pattern.

FIG. 2 shows an exemplary flowchart for locating a code 22 in image data captured by the code reader 10. This method can be carried out in the control and evaluation unit 26 or at least partially externally. It is initially described in an overview of three steps, which are then explained in more detail with reference to FIGS. 3 to 5. It should be noted that the sequence of all the sub-steps of FIGS. 3 to 5 is particularly advantageous, but the invention also includes sub-combinations, thus each sub-step is may also be understood as optional.

In a step S10, candidate positions for a finder pattern are found by evaluating the rows of pixels along mutually parallel scan lines through the image, preferably line by line. On these scan lines, when they cross a finder pattern, edge transitions lie at mutual distances characteristic of the finder pattern. In this way, the center of a suspected finder pattern can be roughly located. This position is called a candidate position because a candidate for a finder pattern has been detected there.

In a step S20, the vicinity of an edge position is further examined to precisely locate the finder pattern and confirm that it is a finder pattern. The result is the exact location of the finder pattern, for example in the form of a frame around those pixels that belong to the finder pattern.

In a step S30, the finder pattern is verified. After the exact location is known from step S20, the properties of the located finder pattern can be compared with the known properties of a finder pattern down to the level of individual code modules. Verification steps are possible which did not contribute to the finding in step S20 and which are in particular much more accurate. False positive finder patterns are thus filtered out very efficiently. This also makes it possible to remain somewhat more tolerant in step S20 and, for example, initially allow partially hidden finder patterns. Such an interplay of initially more generous selection in step S20 and then particularly precise verification in step S30 means that the vast majority of codes are found and they really are codes.

Figure 6:
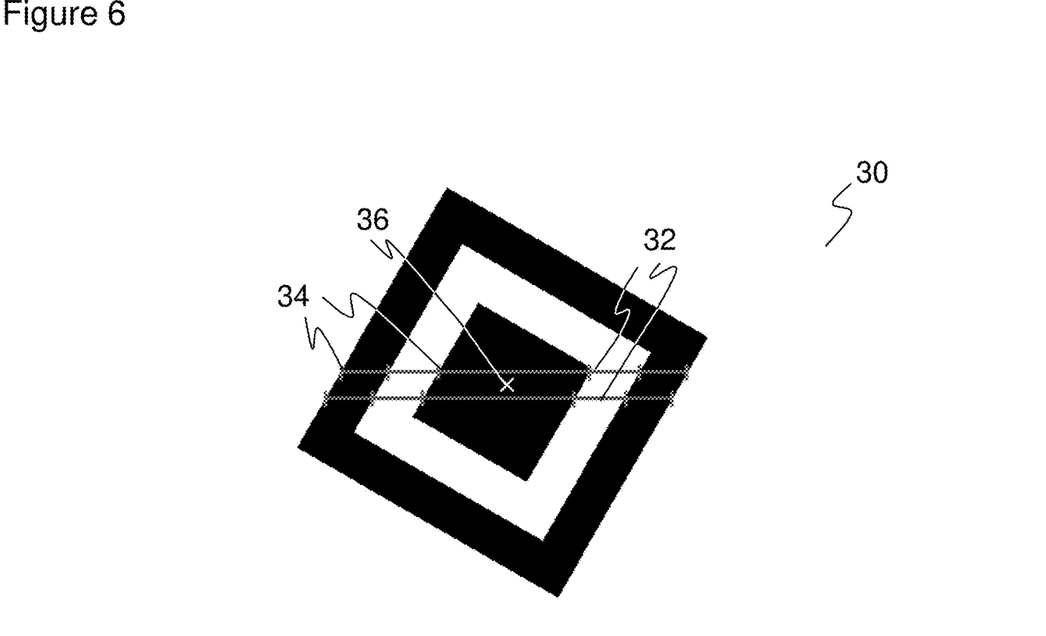
FIG. 6 an exemplary representation of a finder pattern with scan lines and edge transitions for finding a candidate position of the finder pattern.

FIG. 3 shows an exemplary flow chart for locating a candidate position with possible sub steps of step S10 of FIG. 2. This is illustrated in FIG. 6, which shows an exemplary finder pattern 30. In a step S11, parallel scan lines 32 are drawn through the image area to be examined, preferably horizontal scan lines, of which FIG. 6 shows only two for the sake of clarity. Along the scan lines 32, edge transitions 34 between light and dark code areas or vice versa between dark and light code areas are determined.

In a step S12, the distances between the edge transitions of a scan line are checked. In the case of a scan line 32 through a finder pattern 30, six consecutive edge transitions 34 must have mutual distances in the ratio 1:1:3:1:1. This is because the finder pattern consists of a center with 3×3 code modules surrounded by two alternating rectangular rings of the width of one code module each. This results in the aforementioned 1:1:3:1:1 ratio for any direction of scan line 32 through the finder pattern. Thus, if six edge transitions 34 are found along a scan line 32 at intervals in the ratio 1:1:3:1:1, taking into account a tolerance, a finder pattern 30 is assumed at this location. The associated candidate position is preferably the center of the edge transitions, calculated for example as the common center of gravity of all edge transitions or only of the outermost of the six edge transitions considered.

In a step S13, candidate positions of successive scan lines 32 are combined into a candidate position 36, since this is not a new finder pattern in each case, but the same finder pattern 30 that is crossed a plurality of times by the successive scan lines 32. Again, there are various calculation methods, for example as the center of gravity of all edge transitions of the scan lines 32 concerned, only of the respective outermost edge transitions per scan line 32 and/or only of the outermost scan lines 32, or by determining a common center from the multiple candidate positions per scan line 32.

FIG. 4 shows an exemplary flow chart for the precise localization of the finder pattern in a vicinity of the candidate position with possible substeps of step S20 of FIG. 2. In a step S21, which is illustrated by the finder pattern 30 shown in FIG. 7, beams 38 are formed in a star shape starting from the candidate position 36, here exemplarily sixteen of these beams 38 in a uniform angular grid with a mutual angular spacing of 22.5°. On each of the beams 38, the three edge transitions closest to the origin in the candidate position 36 are determined. In deviation from FIG. 7, the candidate position 36 may lie somewhat off-center in the 3×3 center of the finder pattern 30, depending on the specific result of steps S10-S13.

Figure 7:
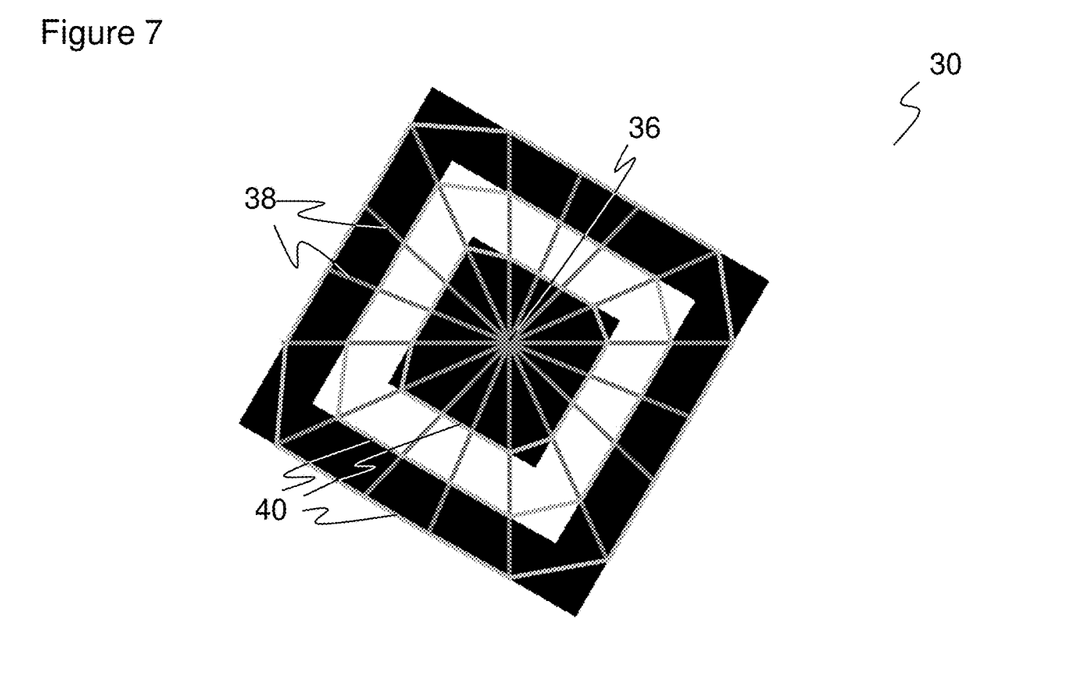
FIG. 7 an exemplary representation of a finder pattern with star-shaped beams and with rings connecting edge transitions along the beams.

In a step S22, the respective innermost, middle and outermost of the three edge transitions found for each beam 38 are connected to one another. If no three edge transitions could be found for a beam 38 in step S21, the corresponding point in ring 40 is omitted.

In the case that the candidate position 36 is located in a finder pattern 30 as in FIG. 7, these rings 40 coincide by and large with the light-dark transitions of the finder pattern 30. This is not true for some ring sections because of the simple generation of the rings by connecting lines; this will be discussed later at step S23.

Figure 8:
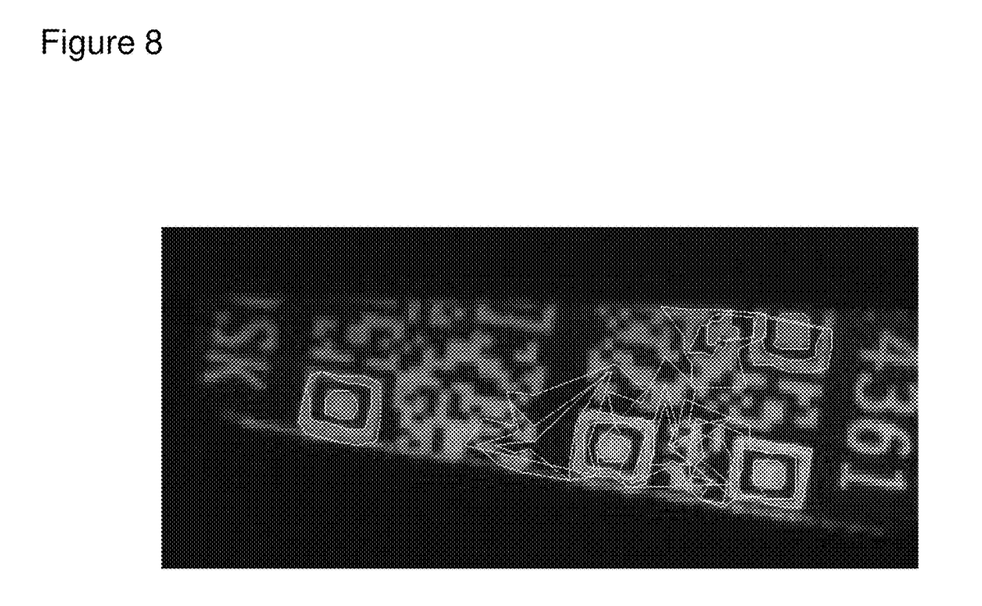
FIG. 8 an example of rings according to FIG. 7 in an image with multiple codes and finder patterns.

Before doing that, it is referred to FIG. 8 showing an example of an image with multiple finder patterns to which step S22 was applied. The existing finder patterns are quite well matched by the rings. At the top right there is an example where points had to be skipped because no three edge transitions were found in some rays. Besides the located finder patterns, there are some false positive candidate positions where the connecting lines can hardly be called a ring and rather form a jumble. This is due to the fact that at these candidate positions the three edge transitions are formed by some structures, but not a finder pattern, and are partly quite far away. The false positive candidate positions will be filtered out by later steps. In principle, if the deviation is as clear as in some cases of FIG. 8, they would be already recognizable by the completely implausible distance ratios of the edge transitions along the affected rays 38.

Figure 9:
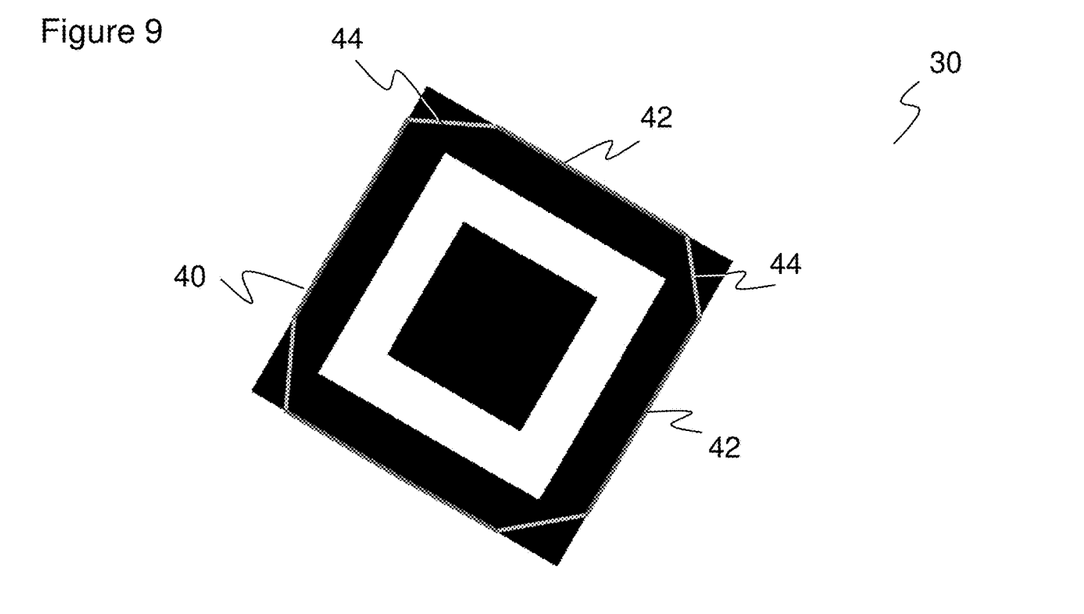
FIG. 9 an exemplary representation of a finder pattern with confirmed and unconfirmed ring sections of an outer ring.

In a step S23, the ring sections of the rings 40 are confirmed. FIG. 9 illustrates this for the outermost ring 40. To confirm a ring section, it is checked whether the corresponding line runs along a light-dark edge. In FIG. 9, this is the case for the ring sections 42 that are thus confirmed, while the ring sections 44 that are not confirmed run within a dark area and thus on no light-dark edge. One way to find the confirmed ring sections 42 is to use a Sobel filter to determine the respective direction of a light-dark transition. A confirmed ring section 42 must lie on the points carved out by the Sobel filter, although individual outlier points can be tolerated.

Figure 10:
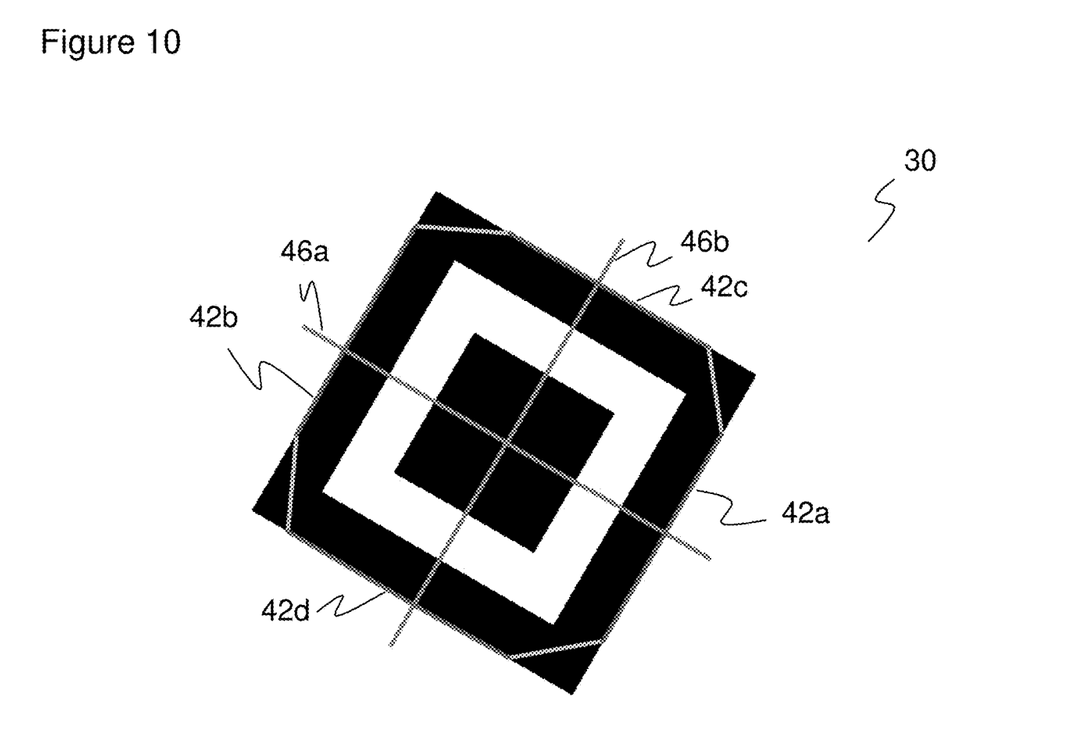
FIG. 10 an exemplary representation of a finder pattern with the two main directions found using grouped ring sections.

In a step S24, the ring sections 42, 44 are classified into two mutually orthogonal groups according to their direction. Preferably, only the confirmed ring sections 42 are used for this purpose. In FIG. 9, it can be seen that the confirmed ring sections 42 run very clearly either horizontally or vertically to the finder pattern 30, while the orientation of the unconfirmed ring sections 44 deviates. Within the two groups, a respective major axis can be determined from the orientations of the respective ring sections 42, 44, for example as the middle orientation within the group. FIG. 10 illustrates the two major axes 46a-b of finder pattern 30 found by this means.

In a step S25, a ring section 42a-d preferably from the outer ring is found in each of the four main directions on both sides of the main axes 46a-b, i.e., to the right, left, up and down according to the now known orientation of the finder pattern 30. Once again, only confirmed ring sections 42 are preferably considered. Four straight lines along the found ring sections 42a-d form a frame around the finder pattern 30, whose position is thus now known. Optionally, the frame can be further refined by evaluating the surroundings of the straight lines, in particular additional scan lines orthogonal to the straight lines, and brought into an even better match with the finder pattern 30.

Figure 11:
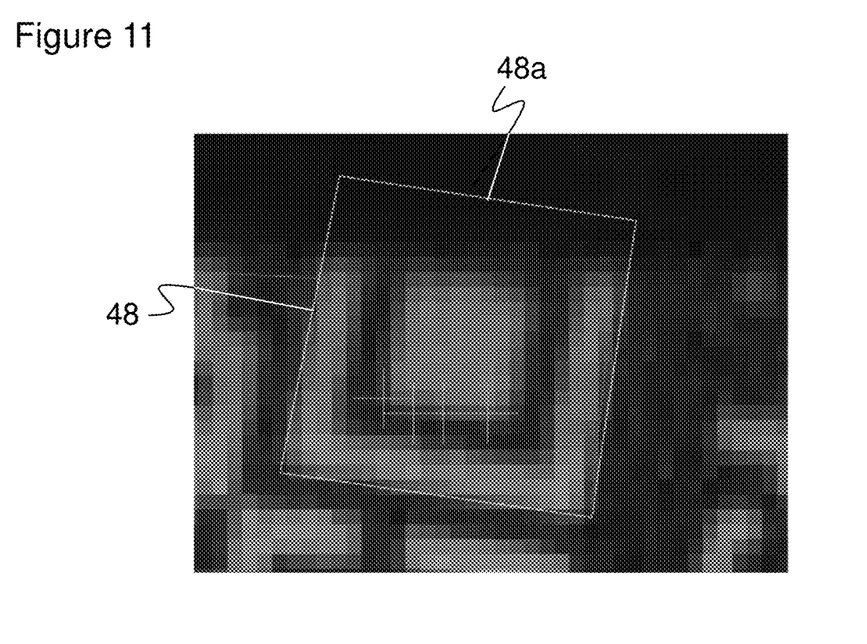
FIG. 11 an example image with a frame around a finder pattern reconstructed in a main direction.

In a step S26, a ring section 42a-d is reconstructed if no ring section 42a-d could be found in one of the main directions, or in any case no ring section 42a-d of the outer ring. FIG. 11 shows an example image of a finder pattern in which a ring section is missing towards the top because of a partial occlusion or other image defect. The frame 48 is therefore reconstructed at the upper edge 48a. For this purpose, the other edges of the frame 48 that could be recognized and/or ring sections of inner rings can be used. The reconstruction or extrapolation further includes the known size ratios of a finder pattern. For the example of FIG. 11 it can be assumed for a simple method that all edges of the frame must be as large as the lower edge. Additional information is that the edge 48a to be reconstructed should be approximately as far from the candidate position 36 as the opposite lower edge. Alternatively or additionally, a ring section is also recognized towards the top, namely of the inner and/or middle ring. Based on the structure of a finder pattern, it is known in which relation the distance of the inner ring is to the outer ring to be reconstructed, namely following the distance ratios 1:1:3:1:1. Thanks to step S26, the position of a finder pattern 30 is still recognized even in critical cases. There is an increased risk that more false positive finder patterns will be detected as a result, which is countered by the final verification now explained.

Figure 12:
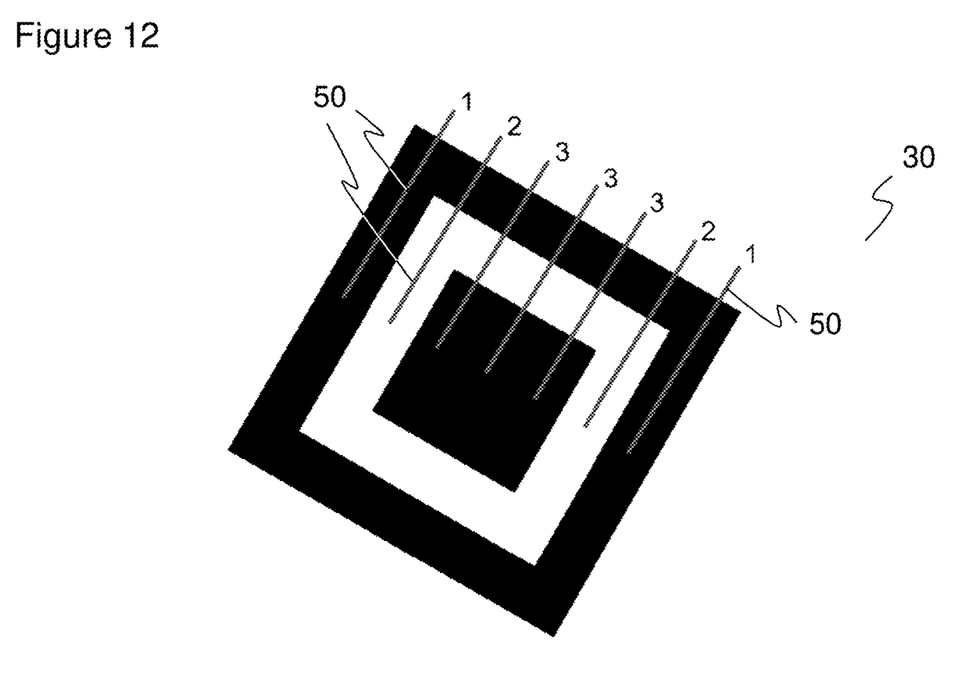
FIG. 12 an exemplary representation of a finder pattern with seven half-lines evenly spaced with respect to each other and covering one half of the finder pattern.

FIG. 5 shows an exemplary flow chart for the verification of a finder pattern with possible sub steps of step S30 of FIG. 2. FIG. 12 illustrates the verification based on an image of a finder pattern 30. In a step S31, seven mutually parallel half-lines 50 are drawn for each main direction, i.e. to the right, left, above and below with respect to the known orientation with main axes 46a-b. The half-lines 50 run orthogonally from one of the main axes 46a-b over one half of the finder pattern 30. With four such groups of seven half-lines 50 each, a total of 28 half-lines results, covering half of the finder pattern 30 four times in mutual 90° rotation with respect to one another. Since a frame 48 was found around the finder pattern 30 in advance, the size of the finder pattern 30 as well as its module size is now known. Therefore, the half-lines 50 can be spaced so that they each pass through a separate row of modules. This is achieved, for example, by evenly dividing the width or height of the finder pattern 30, with deviations being without detrimental effect as long as each half-line 50 still runs through its own module row. The number seven of the half-lines 50 is chosen to match the 7×7 code modules of the finder pattern 30.

In a step S32 the edge transitions per half-line 50 are determined. For this purpose, the search needs to be performed only over a length of the half-line 50 that corresponds to half the size of the frame 48, possibly with a certain buffer. Edge transitions outside the frame 48 cannot be caused by a valid finder pattern 30.

In a step S33, the number of edge transitions found for each half-line 50 is compared with the number expected for a finder pattern 30, namely 1, 2, 3, 3, 2, 1 edge transitions for the seven half-lines 50 in this order. This required number is noted in FIG. 12 at the end of the respective half-line 50. It is also immediately apparent from the illustration why this number is to be expected. For example, the outer half-lines 50 run completely within the dark outer rectangular ring of the finder pattern, so that only a single edge transition should be found at the edge of the finder pattern. In principle, it is conceivable to tolerate a deviation in the number of edge transitions on a half-line 50, but this does greatly dilute the validity of the verification. It is more conceivable not to require agreement between the determined and expected number of edge transitions for all half-lines 50. Such a tolerance can be specified per group of half-lines 50 or all half-lines 50, for example the requirement that per group six of the seven half-lines 50 run over the correct number of edge transitions or a total of 26 of the 28 half-lines 50. The finder pattern 30 is considered to be verified according to step S33 if the comparison provides sufficient agreement with or without tolerance, depending on the embodiment.

In an optional step S34, an additional condition can be checked, namely whether the distances or positions of the edge transitions on the respective half-line 50 are plausible. The one expected edge transition of the outer half-lines 50 is approximately at a distance of half the size of the finder pattern 30 and the frame 48, respectively, and this distance can also be expressed as 3½ module sizes. The same expectation applies to the respective farthest edge transition of the other half-lines 50. The other half-lines 50 have additional inner edge transitions which are expected at a distance of 1½ and 2½ module sizes, respectively. Preferably, tolerances are to be provided for step S34 with respect to the expected distances and/or a ratio of the half-lines 50 which must satisfy the condition of step S34.

In addition to the steps of FIG. 5, further optional additions are possible. If it is determined prematurely that a match within the tolerances cannot be achieved, for example because too many half-lines 50 already do not fulfill an expectation regarding the number and/or spacing of the edge transitions, the verification can be terminated prematurely with a negative result. This happens, for example, if too many modules of the finder pattern are obscured. In another possible test, it is determined for each half-line 50 from the light-dark transitions whether the center of the finder pattern 30 would have to be light or dark to be consistent with this half-line 50. According to this test, there must be sufficient agreement about the color of the center over, say, 75% of the half-lines 50.

Figure 13:
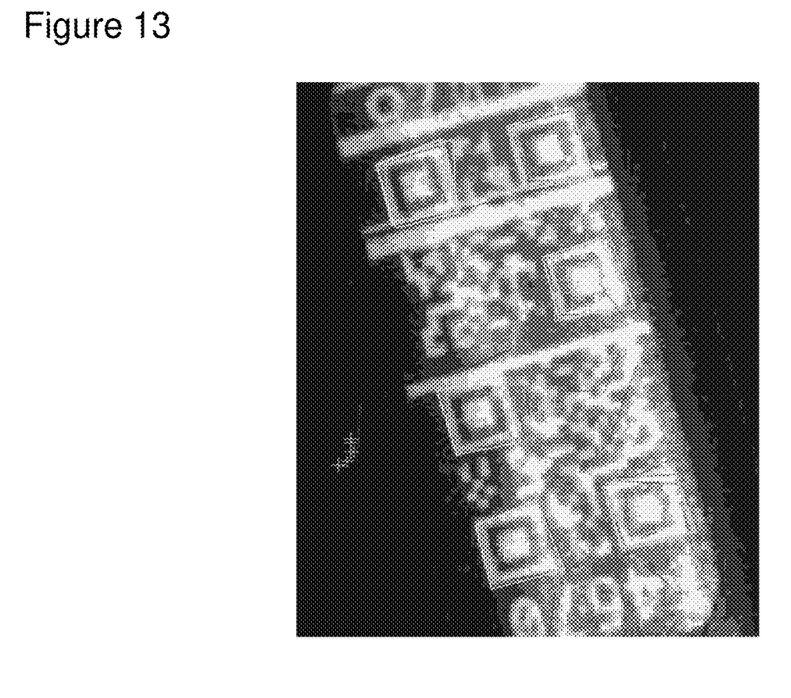
FIG. 13 an exemplary image showing finder patterns found and verified by the method according to the invention.
Figure 14:
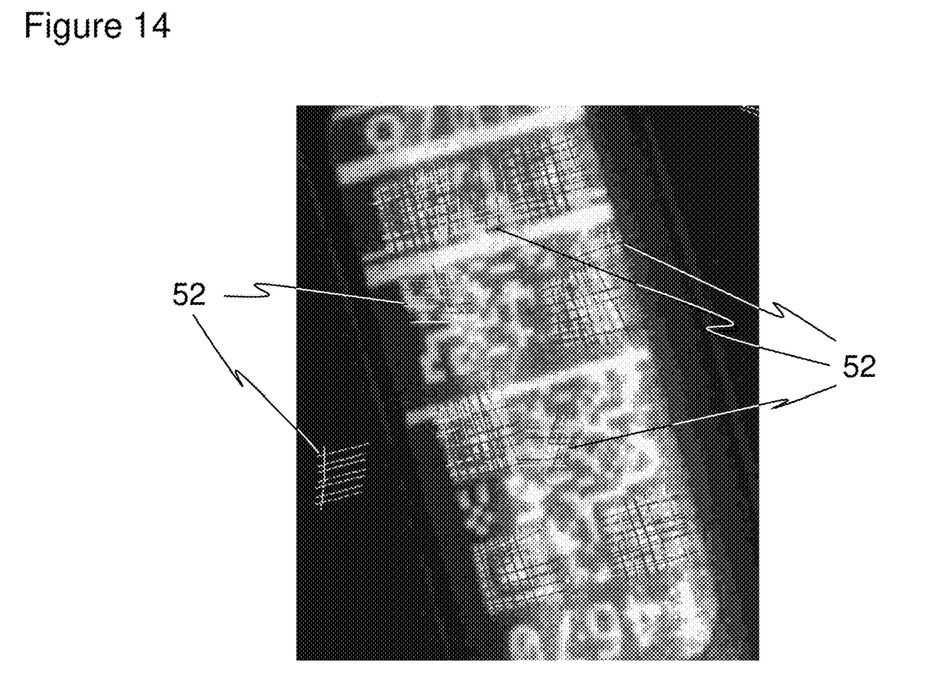
FIG. 14 the exemplary image according to FIG. 13 in an illustration of the verification using seven half-lines according to FIG. 12.

FIG. 13 shows an exemplary image with several finder patterns that were found and verified by the method according to the invention. FIG. 14 illustrates the associated verification with the half-lines just explained. Dark half-lines have confirmed the finder pattern, light half-lines have not. At the positions marked with reference sign 52, the verification rightly failed at several candidate positions, only the correct finder patterns were confirmed by the verification.

In particular for QR codes, a final test can check whether three finder patterns were located in an isosceles-rectangular triangle. Depending on the embodiment, finder patterns that do not meet this condition are immediately discarded, or, for example, an image area with only one or two finder patterns or a deviating arrangement of the finder patterns is only given lower priority or less decoder time in the decoder. The locating of finder patterns according to the invention can be applied in the same way to an Aztec code, in which case, of course, no three finder patterns are expected in a triangle, since an Aztec code has only a single finder pattern in the center. The invention can also be applied to other finder patterns, conditions specific to QR codes or Aztec codes, such as the ratio 1:1:3:1:1, must then be suitably adapted.

As can also be seen from the examples in FIG. 14, more candidate positions can be accepted initially according to the invention in order to increase the sensitivity of the localization of codes. Thus, finder patterns that are difficult to recognize, such as partially hidden finder patterns or those with poor contrast, are also detected. In addition, the position of the finder pattern found in each case, for example as a frame 48, is improved in comparison to a bounding box or other methods of the prior art. The higher number of candidate positions by no means leads to more false positive results because of the final verification; on the contrary, the finder patterns located at the end of the method are even more reliable than in the prior art, so a high selectivity is also achieved. Thereby, even a reconstruction or extrapolation of finder patterns is allowed before verification.

The invention claimed is:

1. A computer-implemented method for locating an optical code, on the basis of a finder pattern of the optical code, in an image having a plurality of pixels, the method comprising the steps of
determining at least one candidate position for the finder pattern on the basis of edge transitions along at least one line through the image;
determining a final position of the finder pattern in a vicinity of the at least one candidate position; and
verifying the final position, wherein said step of verifying the final position includes verifying that the image comprises the finder pattern in the final position by using a known property of the finder pattern,
wherein, in order to determine the position of the finder pattern in a vicinity of the at least one candidate position along beams emanating in a star shape from the candidate position, three nearest edge transitions on each beam are determined.

2. The computer-implemented method according to claim 1,
wherein the optical code is a QR code or an Aztec code.

3. The computer-implemented method according to claim 1,
wherein the at least one candidate position is determined when the edge transitions along the at least one line are spaced apart by a ratio of 1:1:3:1:1, taking into account a tolerance.

4. The computer-implemented method according to claim 1,
wherein the at least one candidate position is determined as the centroid of edge transitions along the at least one line.

5. The computer-implemented method according to claim 1,
wherein, when the edge transitions along a plurality of mutually parallel lines are indicative of the finder pattern, the at least one candidate position is determined centrally between the plurality of mutually parallel lines.

6. The computer-implemented method according to claim 5,
wherein the three nearest edge transition are determined on eight or sixteen beams, from among the beams emanating in the star shape from the candidate position, at equal angular distance from one another.

7. The computer-implemented method according to claim 5,
wherein at least one of a first ring, a second ring, and a third ring is formed, wherein the forming of the first ring includes joining first edge transitions, from among the determined three nearest edge transitions on each beam, to one another, the forming of the second ring includes joining second edge transitions, from among the determined three nearest edge transitions on each beam, to one another, and the forming of the third ring includes joining third edge transitions, from among the determined three nearest edge transitions on each beam, to one another.

8. The computer-implemented method according to claim 7,
wherein a first confirmed ring section of the first ring is determined when a first line corresponding to the first ring section runs along a first light-dark edge, a second confirmed ring section of the second ring is determined when a second line corresponding to the second ring section runs along a second light-dark edge, and a third confirmed ring section of the third ring is determined when a third line corresponding to the third ring section runs along a third light-dark edge.

9. The computer-implemented method according to claim 8,
wherein a Sobel filter is used to determine whether a first direction of a first light-dark transition corresponds to the first line, to determine whether a second direction of a second light-dark transition corresponds to the second line, and to determine whether a third direction of a third light-dark transition corresponds to the third line.

10. The computer-implemented method according to claim 7,
wherein ring sections of the at least one of the first ring, the second ring, and the third ring are classified into horizontal and vertical ring sections, and wherein an orientation of the finder pattern is determined based on the horizontal and vertical ring sections.

11. The computer-implemented method according to claim 10,
wherein an outermost ring section in each of four main directions is selected according to the orientation of the finder pattern, the four main directions being "up", "down", "right" and "left", and wherein straight lines along the ring sections frame a location of the finder pattern.

12. The computer-implemented method according to claim 11,
wherein, if no outermost ring section can be found in one of the main directions, the missing outermost ring section is reconstructed from other ring sections using a known structure of the finder pattern.

13. The computer-implemented method according to claim 1,
wherein, in order to verify the finder pattern, seven mutually parallel half-lines are formed outwardly through one half of the finder pattern, starting from a main axis of the finder pattern and at a uniform distance from one another, and wherein it is required for the verification of the finder pattern that 1, 2, 3, 3, 2, 1 edge transitions lie in this sequence on each of the seven mutually parallel half-lines.

14. The computer-implemented method according to claim 13,
wherein a distance of the 1, 2, 3, 3, 2, 1 edge transitions, relative to the main axis of the finder pattern, is additionally checked on at least one of the seven mutually parallel half-lines.

15. The computer-implemented method according to claim 1,
wherein it is checked whether three finder patterns arranged to form a right-angled triangle are found in the image.

16. The computer-implemented method according to claim 1,
wherein a region of the image localized on the basis of the finder pattern is fed to a decoder in order to read the optical code.

17. An optoelectronic code reading device comprising a light receiving element for recording an image comprising an optical code and a control and evaluation unit configured to locate the optical code, on the basis of a finder pattern of the optical code, in an image recorded using the light receiving element and having a plurality of pixels, in that
at least one candidate position for the finder pattern is determined on the basis of edge transitions along at least one line through the image;
a final position of the finder pattern in a vicinity of the at least one candidate position is determined; and
the final position is verified, wherein the verification of the final position includes verifying that the image comprises the finder pattern in the final position by using a known property of the finder pattern,
wherein, in order to determine the position of the finder pattern in a vicinity of the at least one candidate position along beams emanating in a star shape from the candidate position, three nearest edge transitions on each beam are determined.

18. A computer-implemented method for locating an optical code, on the basis of a finder pattern of the optical code, in an image having a plurality of pixels, the method comprising the steps of
determining at least one candidate position for the finder pattern on the basis of edge transitions along at least one line through the image;
determining a final position of the finder pattern in a vicinity of the at least one candidate position; and
verifying the final position, wherein said step of verifying the final position includes verifying that the image comprises the finder pattern in the final position by using a known property of the finder pattern,
wherein, in order to verify the finder pattern, seven mutually parallel half-lines are formed outwardly through one half of the finder pattern, starting from a main axis of the finder pattern and at a uniform distance from one another, and wherein it is required for the verification of the finder pattern that 1, 2, 3, 3, 2, 1 edge transitions lie in this sequence on each of the seven mutually parallel half-lines.

* * * * *